(12) United States Patent
Duvenhage (10) Patent No.: US 12,465,876 B2
(45) Date of Patent: Nov. 11, 2025

(54) DEVICE AND METHOD FOR SEPARATING A SUSPENSION

(71) Applicant: ANDRITZ Delkor Pty Ltd, Kyalami (ZA)

(72) Inventor: Adriaan Duvenhage, Johannesburg (ZA)

(73) Assignee: ANDRITZ Delkor Pty Ltd, Kyalami (ZA)

( * ) Notice: Subject to any disclaimer, the term of this patent is extended or adjusted under 35 U.S.C. 154(b) by 588 days.

(21) Appl. No.: 17/914,357

(22) PCT Filed: Jun. 11, 2021

(86) PCT No.: PCT/IB2021/055138
§ 371 (c)(1),
(2) Date: Sep. 26, 2022

(87) PCT Pub. No.: WO2021/255597
PCT Pub. Date: Dec. 23, 2021

(65) Prior Publication Data
US 2023/0105820 A1      Apr. 6, 2023

(30) Foreign Application Priority Data

Jun. 15, 2020 (AT) .................................. 50513/2020

(51) Int. Cl.
*B01D 21/24* (2006.01)
*B01D 21/00* (2006.01)
(Continued)

(52) U.S. Cl.
CPC ..... *B01D 21/2405* (2013.01); *B01D 21/0018* (2013.01); *B01D 21/01* (2013.01);
(Continued)

(58) Field of Classification Search
None
See application file for complete search history.

(56) References Cited

U.S. PATENT DOCUMENTS

| 2,137,966 A | * | 11/1938 | Rankin | ................. | C02F 1/5281 |
| | | | | | 415/206 |
| 3,124,000 A | * | 3/1964 | Melas | .................... | G01F 1/005 |
| | | | | | 73/313 |

(Continued)

FOREIGN PATENT DOCUMENTS

GB          1405690          9/1975

OTHER PUBLICATIONS

International Search Report and Written Opinion dated Sep. 24, 2021 for International Patent Application No. PCT/IB2021/055138.
(Continued)

*Primary Examiner* — Bradley R Spies
*Assistant Examiner* — Jeannie McDermott
(74) *Attorney, Agent, or Firm* — Alix, Yale & Ristas, LLP (57) ABSTRACT

A sedimentation device for separating a solid-liquid suspension has a settling tank, a feed well, a feed pipe, an overflow collector and a mixing area. A pump is disposed in the overflow collector and overflow from the overflow collector can be fed through the pump to the mixing area. The solid-liquid suspension to be clarified can be diluted without affecting the sedimentation process, the chemicals can be used to the optimum, and the amount of overflow fed to the mixing area can be exactly determined.

20 Claims, 5 Drawing Sheets

(51) Int. Cl.
*B01D 21/01* (2006.01)
*B01D 21/08* (2006.01)
*B01D 21/34* (2006.01)
*G01F 23/296* (2022.01)

(52) U.S. Cl.
CPC ............ *B01D 21/08* (2013.01); *B01D 21/34* (2013.01); *G01F 23/296* (2013.01)

(56) References Cited

U.S. PATENT DOCUMENTS

| | | | |
|---|---|---|---|
| 5,015,392 A | | 5/1991 | Taylor |
| 5,389,250 A | * | 2/1995 | Wood ................ B01D 21/0012 210/207 |
| 5,601,704 A | * | 2/1997 | Salem .................... B01D 21/06 210/208 |
| 2007/0175806 A1 | * | 8/2007 | McKinney ................ C02F 3/02 210/194 |
| 2010/0018913 A1 | * | 1/2010 | Blum ....................... A61L 2/10 210/136 |
| 2010/0300546 A1 | | 12/2010 | McElvenny |
| 2011/0100931 A1 | * | 5/2011 | Lake ................. B01D 21/0018 210/194 |
| 2013/0186809 A1 | * | 7/2013 | Featherstone ...... B01D 21/0006 210/97 |
| 2015/0014235 A1 | | 1/2015 | Empey et al. |
| 2017/0252673 A1 | * | 9/2017 | Heimdal ............ B01D 21/0042 |

OTHER PUBLICATIONS

International Preliminary Report on Patentability dated Jun. 23, 2022 for International Patent Application No. PCT/IB2021/055138.

* cited by examiner

DEVICE AND METHOD FOR SEPARATING A SUSPENSION

BACKGROUND

The disclosed embodiments relate to a sedimentation device for separating a solid-liquid suspension, comprising a settling tank, a feed well disposed inside the settling tank, a feed pipe comprising an inlet end and an outlet end communicating with the feed well, an overflow collector disposed around the circumference of the settling tank to collect the overflow from the settling tank, and a mixing area to which clarified liquid can be fed from an upper part of the settling tank. The embodiments also relate to a method for diluting a solid-liquid suspension.

Sedimentation devices are typically used to separate solid-liquid suspensions, where such sedimentation devices are also referred to as thickeners or clarifiers. The phases are separated under the force of gravity into the solid and the liquid phase, i.e., the clarified or liquid phase concentrates in the top part of the settling tank. Conversely, the dispersed solid phase concentrates in the bottom part of the settling tank. Clarified liquid phase is typically removed via an overflow collector disposed around the circumference of the settling tank. The solid phase can be discharged from the sedimentation device through the floor of the settling tank. The suspension to be separated is fed typically through the feed well to the sedimentation device. The feed well is intended to permit feed of the solid-liquid suspension to be clarified with as little turbulence as possible and also disturb the sensitive settling processes in the settling tank as little as possible. It can also be an advantage to dilute the suspension to be separated in order to enable better segregation of the phases, for example, and achieve improved flocculation and better use of the chemicals if chemicals are added to the suspension. Clarified liquid, for example, from the upper part of the settling tank is then added to the feed well for dilution purposes, where dilution takes place in the feed well.

For example, U.S. Pat. No. 5,015,392A describes a thickener where the solid-liquid suspension to be clarified and the clarified liquid from the settling tank are fed to the feed well, where the clarified suspension is fed to the feed well through openings and where dilution and the amount of clarified suspension added, respectively, can be set by means of adjustable weirs that open and close the openings.

US2011100931A1 discloses a feed system used in a sedimentation vessel, where an airlift pump is used to cycle at least a portion of the separated liquids from the separation zone and return it to the feed system. This returned portion mixes with the feed slurry and may operate to dilute the feed slurry to a concentration for optimal separation.

US2015014235A1 discloses a feedwell, where the feedwell is to be placed within a thickener. The device comprising a center portion, a launder, a weir, and a mixing zone, where the weir surrounds a portion of the feedwell's center portion and is configured to allow supernatant from a thickener to flow into the launder, the launder being configured to direct the supernatant to the mixing zone, where the mixing zone is configured to mix the supernatant with a feed slurry, prior to introducing a mixture of the supernatant and the feed slurry into the center portion of the feedwell.

SUMMARY

The disclosed device and method provide for improved dilution of the solid-liquid suspension to be separated.

As disclosed herein, this is achieved by the mixing area being disposed around the circumference of the settling tank, the inlet end of the feed pipe communicating with the mixing area, and overflow from the overflow collector and the solid-liquid suspension to be separated being fed to the mixing area, where a pump is disposed in the overflow collector and overflow from the overflow collector can be fed to the mixing area via the pump. The mixing area is disposed around the circumference of the settling tank and is designed as a mixing chamber, for example. This has the advantage that other chemicals added in the mixing area have a longer reaction time because mixing does not take place in the feed well, but the suspension from the mixing area is fed first of all to the inlet end of the feed pipe and then on to the feed well through the feed pipe. This allows better use of the chemicals added. Furthermore, the invention allows complete isolation of the sedimentation process in the settling tank from the mixing and dilution process in the mixing area. The overflow from the settling tank flows over an overflow collector weir to an overflow collector arranged around the circumference of the settling tank. This ensures that the overflow has a minimal solids content. In addition, the overflow is removed uniformly around the entire circumference of the settling tank. This ensures that the local flow speed of the overflow is at a minimum and thus only a minimum of turbulence is also applied overall to the suspension in the settling tank. Hence, the pump is isolated hydraulically from the suspension in the settling tank in conformity with the arrangement of the pump in the overflow collector, especially as the overflow flows over the overflow collector weir. The pump allows dilution of the solid-liquid suspension flowing into the mixing area with the overflow conveyed out of the overflow collector, where dilution in the mixing area can also be controlled by adjusting the pump.

In an advantageous embodiment, the overflow collector is disposed entirely inside the settling tank. As a result, there is no need at all for areas or tanks being disposed outside the settling tank so the sedimentation device can be implemented with a minimum floor space requirement.

A favourable embodiment is characterized in that a stilling chamber is disposed between the mixing area and the overflow collector, where the overflow from the overflow collector can be fed to the overflow collector designed as a suction area in the vicinity of the pump and on to the stilling chamber and the overflow from the stilling chamber can be fed onwards to the mixing area to form a free surface, where the stilling chamber has an overflow weir and the overflow from the stilling chamber can be fed over the overflow weir to the mixing area to form the free surface. Advantageously, the overflow collector in the vicinity of the pump is designed as a suction area. The overflow collector designed as a suction area offers sufficient space to accommodate and dispose the pump. The suction area can accommodate the pump here, where the overflow collector can be designed more compactly with respect to the suction area. During operation, it is important to ensure that the pump is completely covered by the overflow flowing in, otherwise the pump will introduce air into the overflow to be conveyed into the stilling chamber. Advantageously, the pump is disposed vertically in the suction area for this purpose such that the top edge of the pump is arranged vertically beneath the lower edge of the overflow collector. Overflow is possible from the settling tank directly into the suction area, but is not necessary.

Advantageously, the pump conveys from the overflow collector into the stilling chamber first of all, where the overflow from the stilling chamber flows into the mixing area. The stilling chamber allows the flow between the overflow collector and the mixing area to be homogenized. In particular, the overflow from the stilling chamber is fed over an overflow weir to the mixing area to form a free surface. Formation of an even, free surface is made possible by the stilling chamber.

Another favourable embodiment is characterized in that the stilling chamber has a level measuring device. According to homogenization of the flow in the stilling chamber, the level can be determined by measuring the static pressure at a certain height in the stilling chamber. A higher filling level is illustrated exactly by higher pressure. Depending on the formation of an even and free surface in the stilling chamber, alternative measuring methods are also feasible, e.g. capacitive measurement, use of a float switch, or an optical or acoustic measurement of the surface area. The overflow weir can be designed with or without structuring. A structured design of the overflow weir, i.e. a weir with a triangular, rectangular or similar cross section, for example, distinguishes itself in that the amount of overflow can be exactly determined. A measuring weir of this kind is known, for example, as a Thomson weir.

A particularly favourable embodiment is characterized in that the level measuring device is designed as an ultrasonic level measuring instrument, where the height of the free surface can be measured in the stilling chamber by means of the ultrasonic level measuring instrument. An ultrasonic level sensor is disposed above the free surface for this purpose. The space between the ultrasonic level sensor and the free surface can then be assessed from the echo delay of the ultrasonic signal, for example.

Another favourable embodiment is characterized in that the overflow from the overflow collector into the stilling chamber is disposed vertically below the overflow from the stilling chamber into the mixing area. Advantageously, the overflow from the overflow collector fed to the stilling chamber is carried upwards vertically in the stilling chamber. This allows special homogenizing of the flow in the stilling chamber.

A favourable embodiment is characterized in that the pump is disposed largely horizontally, where the overflow from the overflow collector designed as a suction area can be fed horizontally through the pump to the stilling chamber. Advantageously, such a low installation height for the pump can be achieved in the suction area. Here, the suction area in the vicinity of the pump is designed with a suitable size to be able to accommodate the entire pump, where the overflow collector can have a more compact design compared to the suction area containing the pump. During operation, it is important to ensure that the pump is completely covered by the overflow flowing in, otherwise the pump will introduce air into the overflow to be conveyed into the stilling chamber. For this purpose, it is an advantage if the pump is disposed vertically in the suction area such that the top edge of the pump is arranged vertically beneath the lower edge of the overflow collector. Similarly, the horizontal arrangement of the pump advantageously allows homogenization of the flow in the stilling chamber. For this purpose, the overflow from the suction area is brought into the stilling chamber horizontally, deflected and then carried upwards vertically in the stilling chamber and forms a free surface there. Homogenization of the flow can be improved by further built-in components in the stilling chamber. Screen plates, screen panels, wire webs, for example—i.e., built-in components in general that cause a loss of pressure in flows when they pass through them, are suitable for this purpose. Another particular advantage is the design of the pump in the overflow collector as an axial flow pump. Axial flow pumps allow advantageous guiding of the solid-liquid suspension in axial direction, and they are available in a robust design and, therefore, particularly suited to applications in solid-liquid suspensions.

Another favourable embodiment is characterized in that the overflow collector comprises a first area and a second area, the overflow can be fed from the first area to the stilling chamber, and the overflow from the second area can be discharged from the sedimentation device, where the first area and the second area of the overflow collector are separated from each other by a partition. Thus, the overflow intended for mixing with the solid-liquid suspension to be clarified can be set advantageously. Depending on the proportion of the entire overflow collector containing overflow taken up by the first area, the proportional amount of the entire overflow flowing into the overflow collector from the settling tank is available for dilution and mixing, respectively, in the mixing area. The overflow flowing into the second area can thus be removed from the sedimentation device separately. An advantage is also the design with several mixing areas around the circumference of the settling tank, where each mixing area is assigned a pump. The design with several pumps permits optimum selection of the individual pump for the duty point and operation of the pump at maximum efficiency.

The inventive embodiments also relate to a method for diluting a solid-liquid suspension, where the suspension is fed to a sedimentation device according to the invention and the overflow from the settling tank is collected in the overflow collector disposed around the circumference of the settling tank.

Improved dilution of the solid-liquid suspension to be separated is achieved in that the pump disposed in the overflow collector conveys the overflow from the overflow collector to a mixing area disposed around the circumference of the settling tank, the solid-liquid suspension fed to the mixing area is diluted in the mixing area, and the diluted suspension is fed through the inlet end of the feed pipe to the feed well communicating with the outlet end of the feed pipe. As disclosed herein, chemicals added in the mixing area have a longer reaction time in the solid-liquid suspension to be clarified before it is fed to the settling tank via the feed well. As the overflow is removed at the same time round the entire circumference of the settling tank, this ensures that there is no effect on the sedimentation process in the settling tank. As the effect of the pump is only given in the overflow collector, the suspension in the settling tank and the overflow in the overflow collector are isolated hydraulically, particularly as the overflow flows over the overflow collector weir. Similarly, dilution in the mixing area can be controlled by appropriate adjustment of the pump.

An advantageous embodiment is characterized in that the pump conveys the overflow out of the overflow collector designed as a suction area into a stilling chamber and the overflow from the stilling chamber is fed to the mixing area, where the overflow flows over the overflow weir to form a free surface. The overflow from the overflow collector is brought advantageously to the lower part of the stilling chamber, is deflected there and flows through the stilling chamber largely vertically from the bottom to the top. In the upper part of the stilling chamber, the overflow then flows over the overflow weir of the stilling chamber, where the overflow forms a free surface in the stilling chamber. The stilling chamber allows the flow of overflow into the mixing area to be homogenized. Similarly, the stilling chamber advantageously enables simple and exact determination of the amount of overflow flowing into the mixing area, where the formation of a free surface in the stilling chamber is essential.

Another favourable embodiment of the method is characterized in that the amount of overflow from the stilling chamber fed to the mixing area is determined by measuring the filling level in the stilling chamber, where dilution of the solid-liquid suspension and the amount of overflow from the stilling chamber transferred to the mixing area, respectively, is adjusted by adjusting the pump. Advantageously, measuring of the filling level in the stilling chamber enables exact determination of the overflow amount flowing over the overflow weir into the mixing area. Measurement of the filling level in this way would be possible, for example, by static pressure measurement. The filling level can also be measured by means of ultrasonic level measurement, for example. In this case, the overflow weir can be unstructured or structured.

An advantageous embodiment is characterized in that the solids content in the solid-liquid suspension is determined before, in or after the mixing area and the desired dilution of the solid-liquid suspension is set by adjusting the pump. If the solids content in the solid-liquid suspension is measured, the pump can be adjusted directly to set the desired solids content. If the solids content in the solid-liquid suspension is measured after the mixing area, the solids content set is determined directly. If the solids content in the solid-liquid suspension is measured before the mixing area, it is possible to control the pump. It can be advantageous, for example, to combine measurement of the solids content with measurement of the amount of overflow coming from the stilling chamber into the mixing area. In this case, the amount of overflow can be determined by measuring the filling level.

A similarly advantageous embodiment is characterized in that the pump conveys the overflow from the overflow collector designed as a suction area into the stilling chamber largely horizontally and the overflow flows largely vertically upwards through the stilling chamber. In this case, the overflow from the overflow collector is brought to the lower part of the stilling chamber, deflected, and flows largely vertically upwards, where the overflow flows over the overflow weir and into the mixing area. Here, the overflow forms a free surface in the upper part of the stilling chamber. Advantageously, the flow is homogenized in the stilling chamber. Additional built-in components in the stilling chamber can enhance homogenization.

Another favourable embodiment is characterized in that the overflow from the first part of the overflow collector is fed through the pump to the stilling chamber and the overflow from the second part of the overflow collector is discharged from the sedimentation device, where the overflow flowing into the first and second areas is divided by means of a partition disposed in the overflow collector. The overflow that can be removed from the first area is then available for dilution and mixing purposes in the mixing area. The design with several mixing areas around the circumference of the settling tank, where one pump is assigned to each mixing area and the individual pump is correspondingly close to its duty point and hence can be operated efficiently, is also advantageous.

BRIEF DESCRIPTION OF THE DRAWINGS

The invention will now be described using the examples in the drawings.

DETAILED DESCRIPTION

Figure 1:
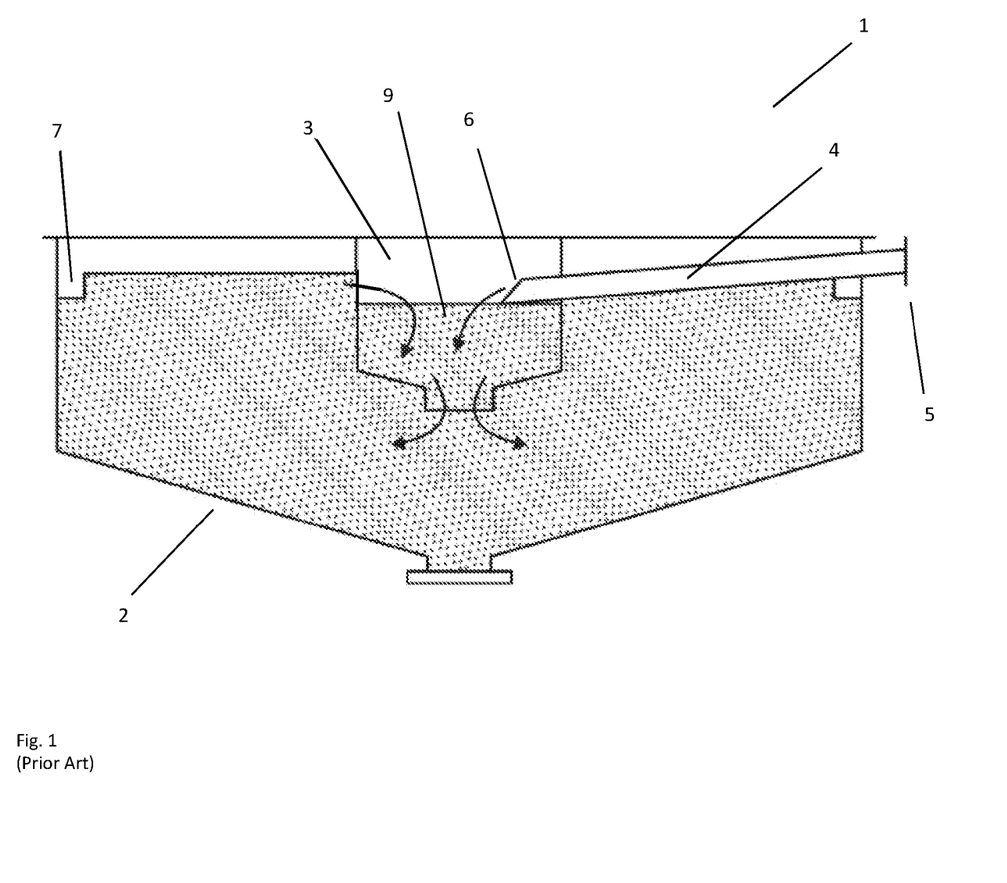
FIG. 1 shows a sedimentation device according to the state of the art.

FIG. 1 shows a sedimentation device 1 according to the state of the art, where a solid-liquid suspension is fed through an inlet end 5 of the feed pipe 4 to the settling tank 2. The outlet end 6 of the feed pipe 4 communicates with the feed well 3. Here, a mixing area 9 is formed in the feed well 3, where the suspension fed in through the feed pipe 4 and the overflow flowing out of the settling tank 2 and into the feed well 3 are mixed and diluted in the mixing area 9. The feed well 3 has an opening in the lower part and is connected hydraulically to the settling tank through this opening. Sedimentation takes place in the settling tank 2, where the solids from the solid-liquid suspension are separated downwards and concentrate in the lower part of the settling tank 2. Correspondingly low-solids and clarified suspension concentrates in the upper part of the settling tank 2. The overflow collector 7 is also disposed around the circumference of the settling tank 2 in the upper part of the settling tank 2. Here, clarified suspension flows out of the settling tank 2 as overflow into the overflow collector 7.

Figure 2:
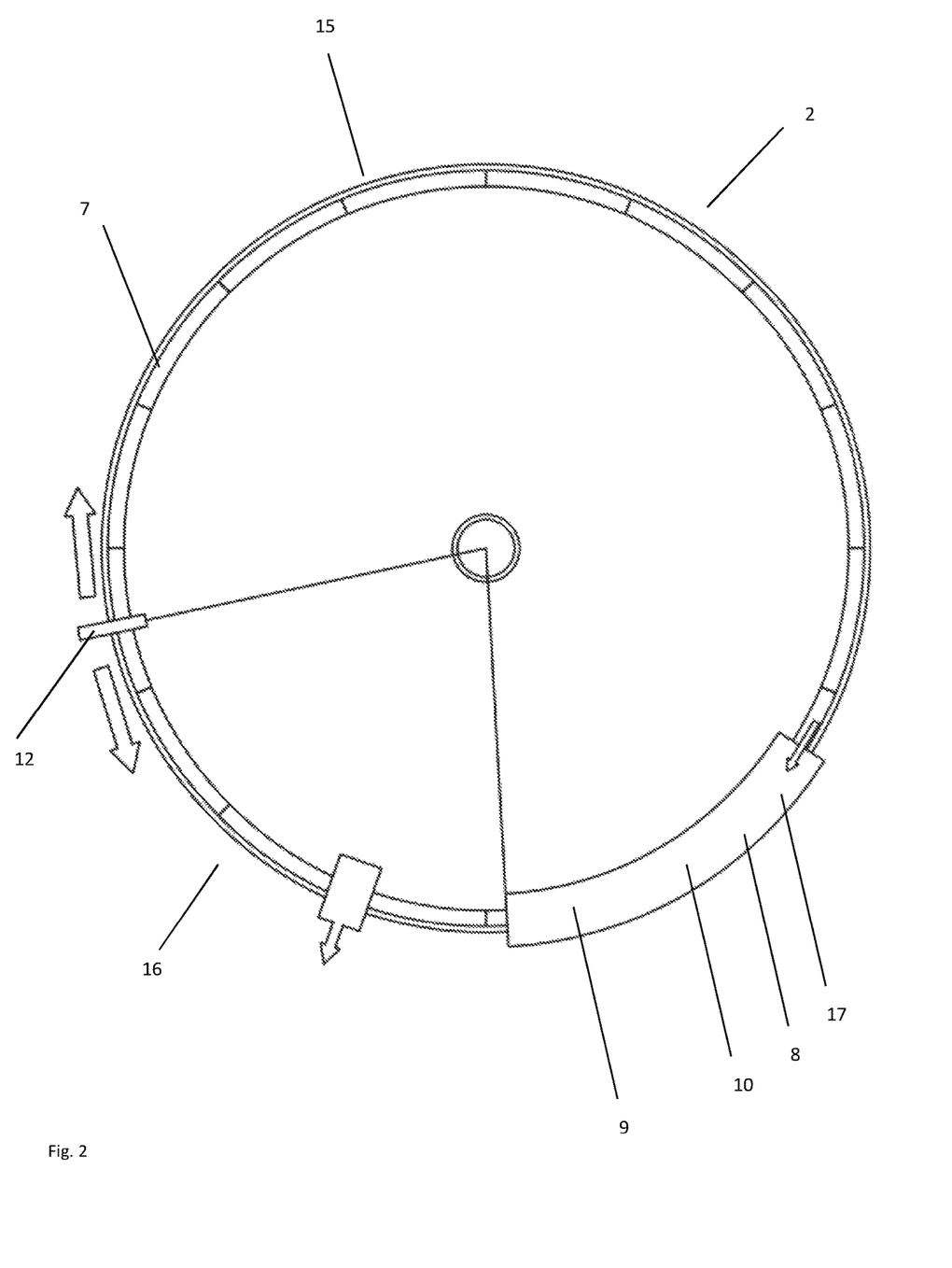
FIG. 2 shows a top view of a sedimentation device, especially a first and second area of the overflow collector.

FIG. 2 shows a top view of a sedimentation device according to the disclosure, especially a first and second area of the overflow collector, where the first 15 and second 16 areas are divided by a partition 12. The overflow collector 7 is disposed around the circumference in the upper part of the settling tank. The partition 12 separates the first 15 and second 16 areas of the overflow collector. A partition 12 of this kind can be designed simply as a partition plate or weir. All the overflow from the settling tank 2 flowing into the second part 16 of the overflow collector 7 can be discharged from the sedimentation device. All the overflow flowing out of the settling tank 2 into the first part 15 of the overflow collector 7 can be fed through the pump 8 to the mixing area 9, where the pump 8 is disposed in the overflow collector 7 designed as a suction area 17. First of all, the overflow is fed advantageously through the pump 8 to the stilling chamber 10 and out of the stilling chamber 10 on to the mixing area 9. The overflow that can be fed to the mixing area 9 is thus determined by means of the overflow flowing into the first area 15 of the overflow collector 7.

Figure 3:
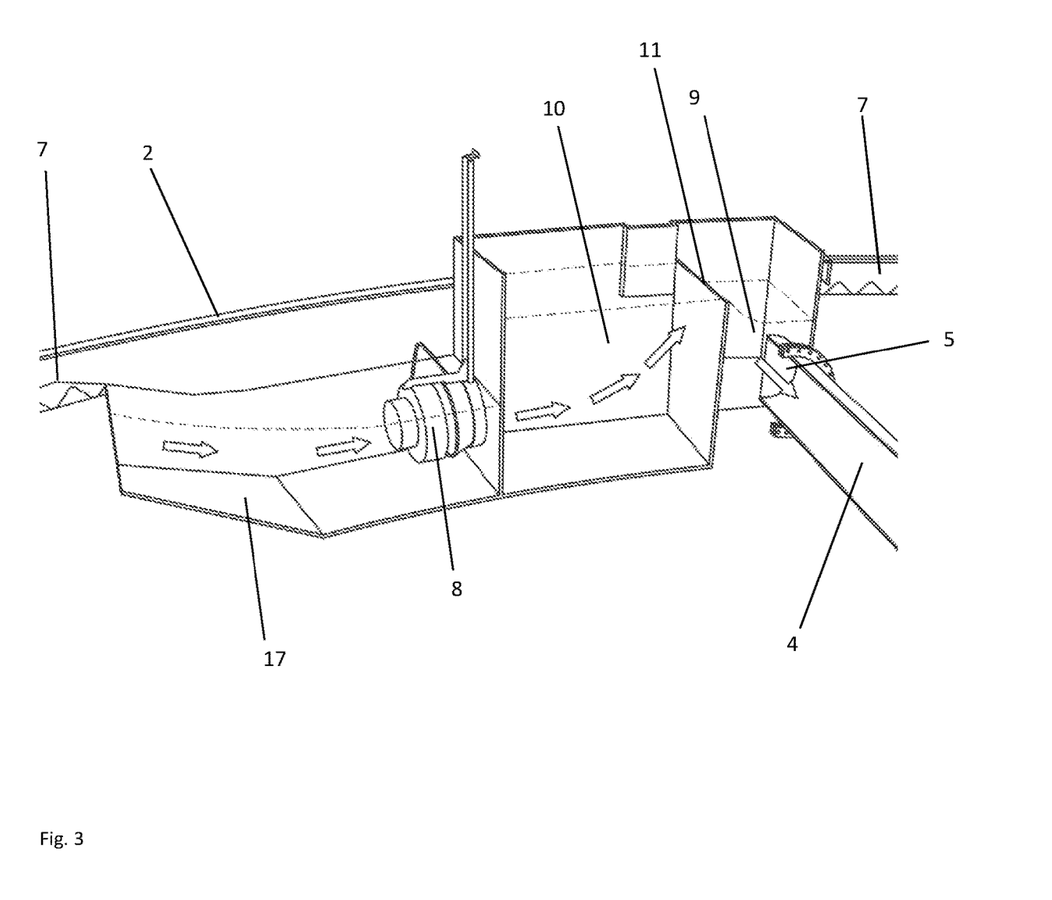
FIG. 3 shows an arrangement of a pump and mixing area in accordance with the disclosed embodiments.

FIG. 3 shows an arrangement comprising a pump 8 and a mixing area 9, where the line of vision runs from the inside to the outside in radial direction. Here, an overflow collector 7 is disposed around the circumference in the upper part of the settling tank 2. The pump 8 is disposed in the overflow collector 7 designed as a suction area 17. The overflow from the overflow collector 7 flowing into the pump 8 is conveyed into the stilling chamber 10 through the pump. Advantageously, the pump 8 is disposed horizontally in the suction area 17 and the overflow is fed horizontally to the stilling chamber 10. It is a particular advantage if the pump 8 is designed as an axial flow pump. The overflow from the stilling chamber 10 can be fed to the mixing area 9 to form a free surface, where the stilling chamber 10 has an overflow weir 11 and the overflow from the stilling chamber 10 can be fed over the overflow weir 11 to the mixing area 9 to form the free surface. In addition, the solid-liquid suspension can be fed to the mixing area 9. The diluted solid-liquid suspension from the mixing area 9 is fed onwards through the inlet end 5 of the feed pipe 4 to the feed well 3 (not shown). In order to ensure that the pump 8 is always covered with liquid, the pump 8 is disposed advantageously in the suction area 17 vertically in such a way that the top edge of the pump is disposed vertically below the bottom edge of the overflow collector 7. In addition, a special controller, e.g., an immersion controller, can be provided in the suction area 17 in order to shut down the pump 8 if the overflow level in the suction area 17 is too low. The overflow conveyed horizontally through the pump 8 into the stilling chamber 10 is deflected in the stilling chamber 10 and guided vertically upwards. This is followed by overflow from the stilling chamber 10 flowing over the overflow weir 11 into the mixing area 9 to form a free surface.

Figure 4:
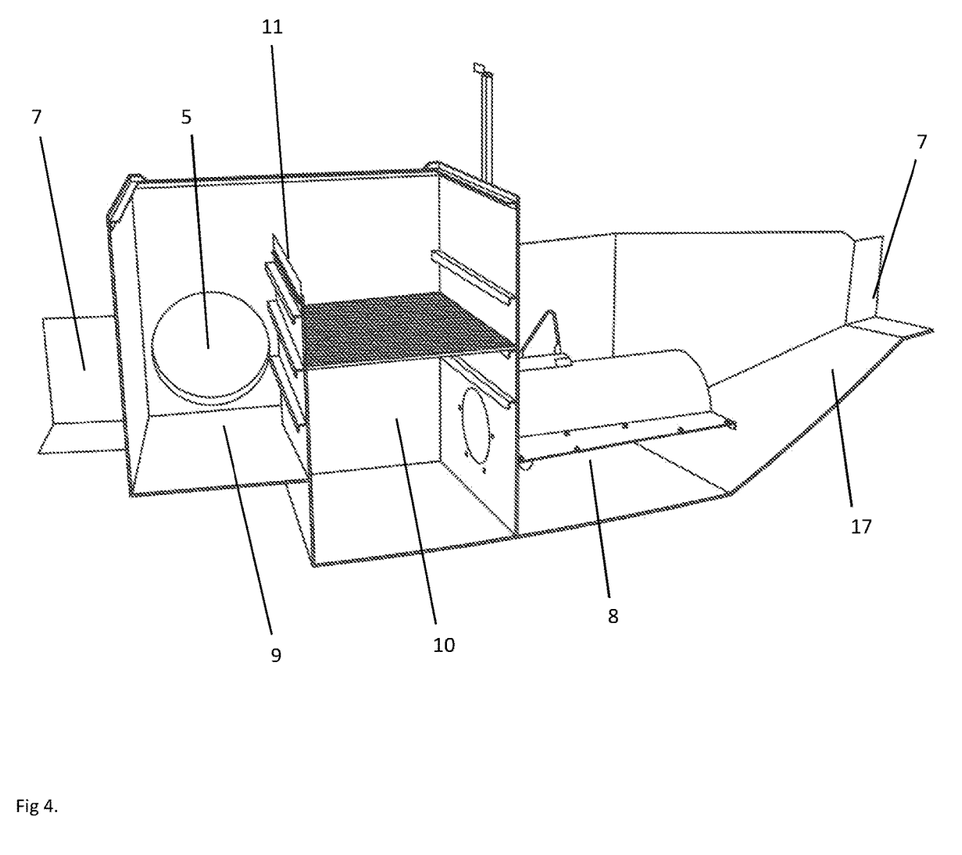
FIG. 4 also shows another arrangement of a pump and mixing area in accordance with the disclosed embodiments.

FIG. 4 shows another arrangement comprising pump 8 and mixing area 9, where the line of vision points from the outside to the inside in radial direction. The wall of the settling tank 2 is not shown. The overflow from the overflow collector 7 can be fed to the pump 8, where the pump 8 is disposed advantageously in the suction area 17 vertically in such a way that the top edge of the pump 8 is disposed vertically below the bottom edge of the overflow collector 7. The pump 8 has a casing here. This makes it possible to effectively prevent air from swirling into the overflow taken in by the pump 8. The overflow is conveyed from the suction area 17 into the stilling chamber 10. Here, the pump 8 is disposed horizontally in the suction area 17 and the overflow is fed horizontally to the stilling chamber 10. It is a particular advantage if the pump 8 is designed as an axial flow pump. The overflow conveyed into the stilling chamber 10 is deflected in the stilling chamber 10 and guided vertically upwards. Additional built-in components in the stilling chamber 10 can help to homogenize the flow in the stilling chamber 10. Screen plates, screen panels, wire webs, for example—i.e., built-in components in general that cause a loss of pressure in flows when they pass through them, are suitable for this purpose. The overflow from the stilling chamber 10 into the mixing area 9 flows over the overflow weir 11 to form a free surface. The solid-liquid suspension can be fed to the mixing area 9, or the mixture of overflow and solid-liquid suspension can be fed onward through the inlet end 5 of the feed pipe 4 into the feed well 3.

Figure 5:
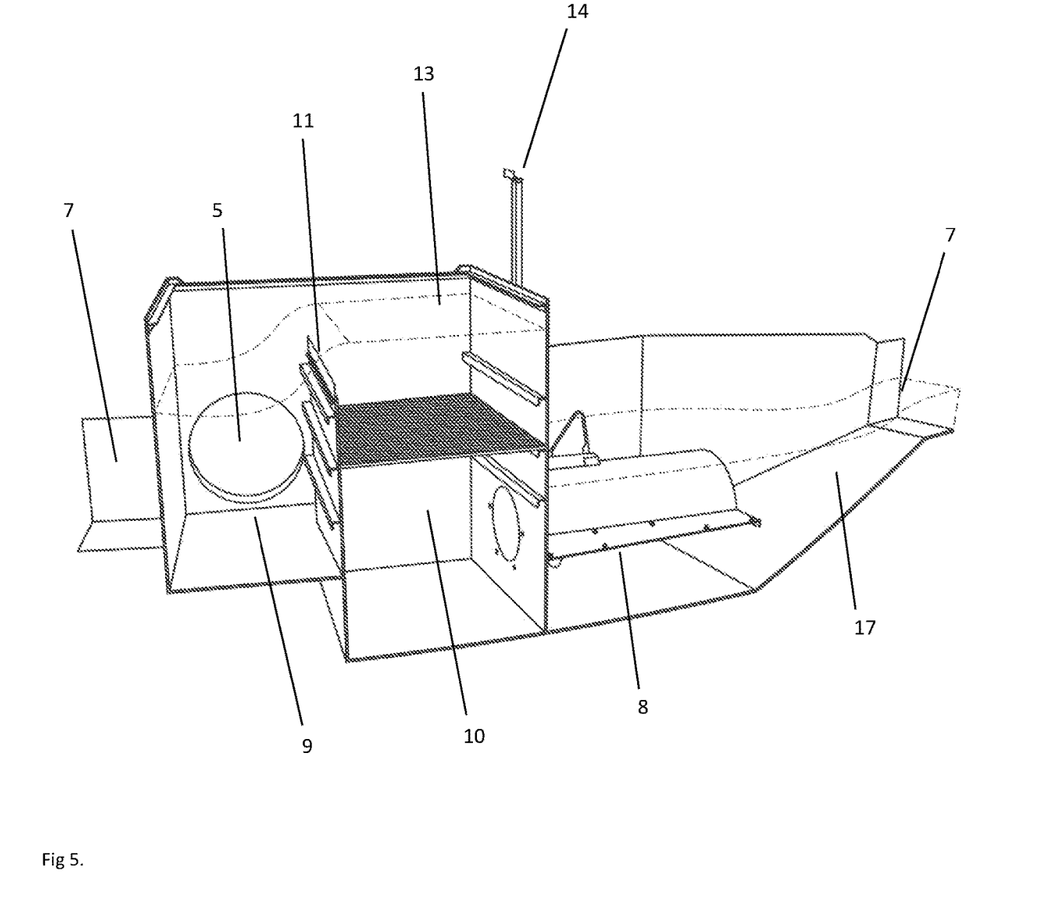
FIG. 5 shows the arrangement of the pump and mixing area of FIG. 4, during operation.

FIG. 5 shows the arrangement according to the disclosure, comprising a pump 8 and mixing area 9, in operation and, in particular, the formation of a free surface 13 in the stilling chamber 10. The overflow flowing into the pump 8 over the overflow collector 7 is signified with a broken line. Here, the pump 8 is disposed vertically in the suction area 17 such that the top edge of the pump 8 is arranged vertically beneath the lower edge of the overflow collector 7. The overflow is conveyed from the suction area 17 into the stilling chamber 10. The overflow conveyed into the stilling chamber 10 is deflected in the stilling chamber 10 and guided vertically upwards. The overflow from the stilling chamber 10 into the mixing area 9 flows over the overflow weir 11 to form a free surface 13. The formation of a free surface 13 allows the filling level in the stilling chamber 10 to be measured, from which the quantity of overflow flowing out of the stilling chamber 10 into the mixing area 9 can be determined.

The disclosed embodiments offer numerous advantages. For example, the solid-liquid suspension to be clarified is diluted without affecting the sedimentation process in the settling tank in any way because the clarified liquid is taken from the overflow collector and is thus isolated from the settling tank and because dilution takes place upstream of the feed well. The invention features a minimum floor space requirement because no mixing area is required outside the sedimentation device. Similarly, the solid-liquid suspension is diluted by the overflow flowing into the mixing area only, so there is no need for a water supply outside the sedimentation device and dilution is possible with internal process water alone. As the solid-liquid suspension to be separated is diluted in a mixing area around the circumference of the settling tank, where it is advantageous to add chemicals in this mixing area, the chemicals added have longer reaction times before entering the feed well, which enables better use of the chemicals. In conformity with the overflow from the stilling chamber flowing over an overflow weir into the mixing area to form a free surface, it is possible to determine the overflow quantity fed to the mixing area easily and precisely. As the overflow is guided horizontally into the stilling chamber, this also allows a compact design and is essential in formation of a uniform, free surface in the stilling chamber.

REFERENCE NUMERALS (1) Sedimentation device
(2) Settling tank
(3) Feed well
(4) Feed pipe
(5) Inlet end of the feed pipe
(6) Outlet end of the feed pipe
(7) Overflow collector
(8) Pump
(9) Mixing area
(10) Stilling chamber
(11) Overflow weir
(12) Partition
(13) Free surface
(14) Level measuring device
(15) First area of the overflow collector
(16) Second area of the overflow collector
(17) Suction area

The invention claimed is:
1. A sedimentation device (1) for separating a solid-liquid suspension, comprising
 a settling tank (2) defining an inside;
 a feed well (3) disposed on the inside of the settling tank (2);
 a feed pipe (4) comprising an inlet end (5) and an outlet end (6) communicating with the feed well (3);
 an overflow collector (7) disposed around a periphery of the settling tank (2) configured to collect overflow from the settling tank (2); and
 a mixing area (9) to which clarified liquid is fed from an upper part of the settling tank (2), wherein
 the mixing area (9) is disposed around the periphery of the settling tank (2), the inlet end (5) of the feed pipe (4) communicates with the mixing area (9), and overflow from the overflow collector (7) and the solid-liquid suspension to be separated are fed to the mixing area (9),
 a pump (8) is disposed in the overflow collector (7) for feeding overflow from the overflow collector (7) to the mixing area (9),
 a stilling chamber (10) having an overflow weir (11) is disposed between the mixing area (9) and the overflow collector (7), the overflow from the overflow collector (7) is fed to the stilling chamber (10), the overflow from the stilling chamber (10) is fed over the overflow weir (11) to the mixing area (9) forming a free surface (13), and a level measuring device (14) is associated with the stilling chamber (10) for measuring the filling level in the stilling chamber (10), thereby enabling determination of the amount of overflow flowing over the overflow weir (11) into the mixing area (9).

2. The sedimentation device (1) according to claim 1, wherein the level measuring device (14) is an ultrasonic level measuring instrument configured for measuring a height of the free surface (13) in the stilling chamber (10).

3. The sedimentation device (1) according to claim 1, wherein the level measuring device (14) operates via one of static pressure measurement, capacitive measurement, measurement by use of a float switch, optical or acoustic measurement of surface area, and structured weir measurement.

4. The sedimentation device (1) according to claim 3, wherein the level measuring device (14) operates via Thomson weir measurement.

5. The sedimentation device (1) according to claim 1, wherein the overflow from the overflow collector (7) is brought to a lower part of the stilling chamber (10), and the overflow weir (11) is positioned in the upper part of the stilling chamber (10).

6. The sedimentation device (1) according to claim 2, wherein the overflow from the overflow collector (7) is brought to a lower part of the stilling chamber (10), and the overflow weir (11) is positioned in the upper part of the stilling chamber (10).

7. The sedimentation device (1) according to claim 1, wherein the pump (8) is positioned substantially horizontally, and the overflow from the overflow collector (7) is fed horizontally through the pump (8) to the stilling chamber (10).

8. The sedimentation device (1) according to claim 5, wherein the pump (8) is positioned substantially horizontally, and the overflow from the overflow collector (7) is fed horizontally through the pump (8) to the stilling chamber (10).

9. The sedimentation device (1) according to claim 1, wherein the pump (8) disposed in the overflow collector (7) is an axial flow pump.

10. The sedimentation device (1) according to claim 1, wherein the overflow collector (7) comprises a first area (15) and a second area (16) that are separated from each other by a partition (12), the overflow can be fed from the first area (15) to the stilling chamber (10), and the overflow from the second area (16) can be discharged from the sedimentation device (1).

11. The sedimentation device (1) according to claim 2, wherein the overflow collector (7) comprises a first area (15) and a second area (16) that are separated from each other by a partition (12), the overflow can be fed from the first area (15) to the stilling chamber (10), and the overflow from the second area (16) can be discharged from the sedimentation device (1).

12. The sedimentation device (1) according to claim 5, wherein the overflow collector (7) comprises a first area (15) and a second area (16) that are separated from each other by a partition (12), the overflow can be fed from the first area (15) to the stilling chamber (10), and the overflow from the second area (16) can be discharged from the sedimentation device (1).

13. The sedimentation device (1) according to claim 1, wherein several mixing areas (9) are disposed around the periphery of the settling tank (2) and a pump (8) is assigned to each mixing area (9).

14. The sedimentation device (1) according to claim 2, wherein several mixing areas (9) are disposed around the periphery of the settling tank (2) and a pump (8) is assigned to each mixing area (9).

15. A method for diluting a solid-liquid suspension, comprising feeding the solid-liquid suspension to a sedimentation device (1) according to claim 1, collecting the overflow from the settling tank (2) in the overflow collector (7) disposed around the periphery of the settling tank (2), conveying the overflow from the overflow collector (7) to a mixing area (9) disposed around the periphery of the settling tank (2) via the pump (8) disposed in the overflow collector (7), feeding the solid-liquid suspension to the mixing area (9) and diluting the solid-liquid suspension in the mixing area to form a diluted suspension, and feeding the diluted suspension through the inlet end (5) of the feed pipe (4) to the feed well (3) communicating with the outlet end (6) of the feed pipe (4).

16. The method according to claim 15, comprising:

conveying the overflow out from the overflow collector (7) into a stilling chamber (10) via the pump, and feeding the overflow from the stilling chamber (10) to the mixing area (9) over the overflow weir (11) to form a free surface (13).

17. The method according to claim 16, comprising determining an amount of overflow from the stilling chamber (10) fed to the mixing area (9) via measuring the filling level in the stilling chamber (10), wherein dilution of the solid-liquid suspension and the amount of overflow from the stilling chamber (10) transferred to the mixing area (9), respectively, are adjusted by adjusting the pump (8).

18. The method according to claim 15, comprising determining the solids content in the solid-liquid suspension before, in or after the mixing area (10), and the setting the desired dilution of the solid-liquid suspension by adjusting the pump (8).

19. The method according to claim 16, comprising conveying the overflow from the overflow collector (7) into the stilling chamber (10) substantially horizontally via the pump (8), wherein the overflow flows substantially vertically upwards through the stilling chamber (10).

20. The method according to claim 15, comprising feeding overflow from the first part (15) of the overflow collector (7) through the pump (8) to the stilling chamber (10); and discharging overflow from the second part (16) of the overflow collector (7) from the sedimentation device (1), wherein the overflow flowing into the first (15) and second (16) areas is divided by a partition (12) disposed in the overflow collector (7).

\* \* \* \* \*